March 24, 1942.   G. E. SWARTZ   2,277,275
RAM MOVING AND LOCKING MEANS
Filed Oct. 26, 1938
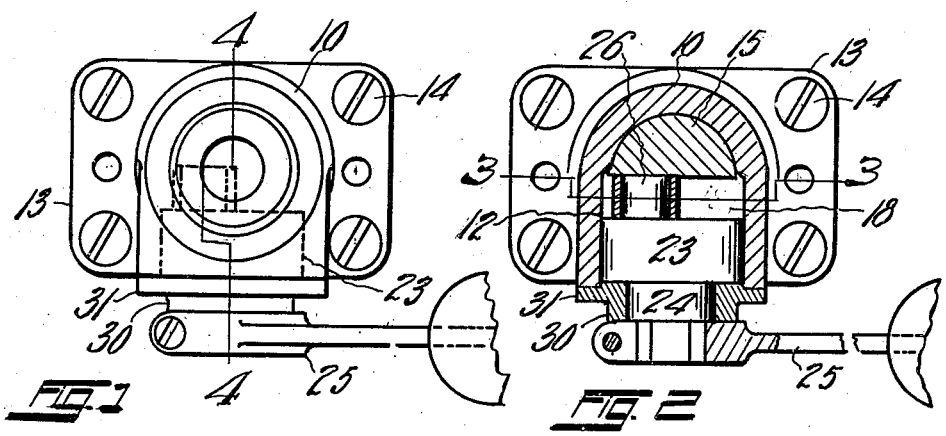
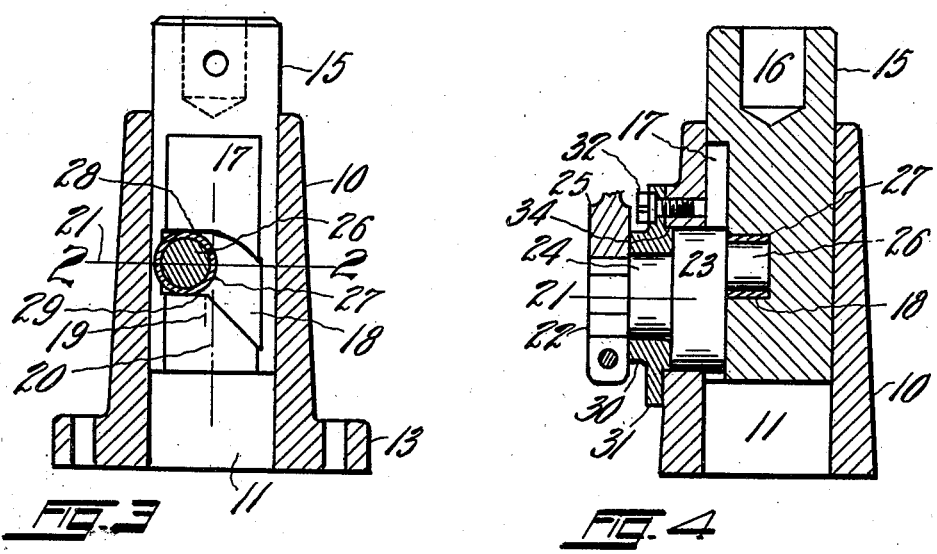
INVENTOR.
Guy E. Swartz
BY
C. F. Heinkel
ATTORNEY.

Patented Mar. 24, 1942

2,277,275

UNITED STATES PATENT OFFICE 2,277,275

RAM MOVING AND LOCKING MEANS

Guy E. Swartz, Detroit, Mich.

Application October 26, 1938, Serial No. 237,161

4 Claims. (Cl. 74—107)

The present invention relates to moving a member for useful work thereby and, when desired, to lock the mechanism frictionally against movement at either one end or at both ends of movement of the member; and to render the moving device transferable from one machine to another and to render any one or any number of the members of the moving means transferable to other machines.

The objects of the present invention are: to provide a means for moving a member for useful work; to render the entire means transferable from one machine to another; to render any one or any number of members of the moving means transferable to other machines; to make the elements of the moving means in units so that the same can easily be transferred to other machines for useful work therein; and to construct the moving means economically, easy and convenient of operation and efficient in operation.

Other objects will be pointed out in the description of the device shown in the accompanying drawing, forming part of this specification, or will become apparent, or obvious, or will suggest themselves upon an inspection of this specification and the accompanying drawing.

The present invention is illustrated, in one embodiment, in the accompanying drawing showing a certain device which has a ram for doing useful work and the device or any one or any number of parts thereof can be transferred to other machines wherein a movable ram can be utilized for doing useful work. The drawing is presented for illustration purposes and is not to be used as a limitation of the present invention. The spirit and intent of the present invention and of the appended claims is the limitation of the present invention.

In the accompanying drawing: Fig. 1 is a plan view of a moving means embodying the present invention. Fig. 2 is a transverse section taken on line 2—2 of Fig. 3 showing more clearly the structure of the driving unit as related to the ram and to the base. Fig. 3 is a vertical section taken on the line 3—3 of Fig. 2 showing the relation of the groove relative to the driving unit and to the ram. Fig. 4 is a vertical section taken on the line 4—4 of Fig. 1 showing more clearly the relations of the base unit and the driving unit and the ram unit.

Similar reference characters refer to similar parts throughout the views.

Description of the device shown in the accompanying drawing.

The base 10, forming one unit, has the vertical bore 11 all the way therethrough and the bore 12 at right angles to the bore 11 and the axes of the bores 11 and 12 intersection. The foot part 13 of the base is on the bottom thereof providing a means for the base 10 to be attached to any kind of machine that can make use of a moving means as or similar to the one here shown. The screws 14 pass through the foot 13 for holding the base 10 to the machine wherein the below described moving means, or one similar thereto can be used.

The ram 15, forming another unit, is axially movable in the bore 11 and has the hole 16 in the upper end thereof for connection of the ram with the clamps 15a of the machine wherein the present moving means is used. The flat part or surface 17 is provided on the lower part of the ram and has the groove 18 transversely of the axis of the ram 15. This groove 18 is here shown as extending transversely of the axis of the ram at the left hand side of Fig. 3 and as being arcuate at the right hand side. The arcuation of this arcuate part of the groove 18 has the center of arcuation at the left as seen in Fig. 3, indicated by the line 19 at one side of the vertical axis 20 of the ram 15 and also at one side of the horizontal axis 21 of the bore 12. This arcuation of the groove is made so that rotative movement of the below described crankpin will wedge itself by rotative movement thereof and lock the ram 15 against axial movement and does this locking by the same movement that effects the axial movement of the ram 15. A similar arcuation can also be applied to the left hand side of the groove 18 so that locking could be effected at either one or the other end of the groove 18.

The groove 18 may extend square across the ram 15 or traversing the axis of the ram at an inclination. When square across or inclined, the motion of the ram 14 will, of course, be changed so that this sort of groove can be utilized for changing direction or varying the direction of motion of the ram. This unit of the ram may also be transferred to another machine or to another moving means.

The shaft 22, forming another unit also transferable to other machines, has the enlarged head 23 journaled in the bore 12 and the large bearing surface between the head 23 and the wall of the bore 12 provides not only efficient bearing surface but also provides a friction locking surface when the part 23 is forced sidewise so that an additional locking means is not necessary. The shaft 22 also has the diametrically smaller part 24 adjacent to the part or head 23 and is journaled in the below described cover. The outer end of the shaft 22 is polygonal to receive the handle 25 in various angular relation to the shaft 22 so that the handle can be adjusted to most convenient positions relative to the shaft 22 and held there by the clamping means shown. The crankpin 26 is on the inner end of the enlarged part 23 and has the bushing 27 therein to distribute the load more evenly over a larger area of the crankpin surface for preventing the wearing of spots on the crankpin. The bushing 27 engages the walls 28 and 29 of the groove 18. This unit is also transferable from one machine to another by merely removing the below described cover and slipping the shaft out of the base 10.

The cover 30 has the flange 31 held to the base 10 by the screws 32 and also has the journal bearing for the diametrically smaller part 24 endwise abutting, by one side thereof, the part or head 23 and by the opposite side thereof, the handle 25 thus keeping the shaft 22 against axial movement thereof. The end 34 of the bearing for the diametrically smaller part 24 fits into the bore 12 in the base and thereby centralizes the driving means in the base 10.

Upon rotative movement of the shaft 22 by means of the handle 25, the bushing 27 being in the groove 18, the crankpin moves the ram 15 axially according to the direction of movement of the handle 25 by the bushing engaging one of the walls of the groove and pushing the ram into axial movement and this ram movement is transmitted to whatever mechanism is on or connected to the ram 15. With the groove 18 formed as shown, the bushing 27 will wedge itself near the end of the ram movement by the eccentricity of the walls of the groove 18 relative to the axis of rotation of the shaft 22 and thereby frictionally locks the ram against movement in addition to or independent of the friction caused by the other parts of the mechanism in their respective seats. Either of these frictional locking means may be used individually or independently or both combined as desired.

When the shaft 22 is rotated, the crankpin 26 travels in an arcuate path about the axis of the shaft 22 and, being in the groove 18, engages the side walls of the groove and moves the ram 15 axially more quickly while the crankpin is moving through the more squarely traversing part of the groove and less quickly while moving through the less squarely traversing part of the groove.

This movement of the crankpin 26 through the groove 18 produces a pressure of the diametrically enlarged part 23 of the shaft 22 against its bearing and also produces or causes pressure of the side of the part 23 against its bearing as well as between the journal part 24 and its bearing.

This side pressure acts more obliquely and is not so pronounced while the crankpin is travelling through the more squarely traversing part of the groove than while travelling through the less squarely traversing part of the groove and therefore produces more friction in the latter movement than in the former.

The friction of the latter movement is here made use of to frictionally lock the moving means against self reversing and this locking is attained at or near the end of the arcuate movement of the crankpin and locks the mechanism by means of power applied to the lever or handle 25.

Reversing of the movement of the handle 25 first releases the pressure between the moving parts of the devices and thereby releases the locking for operation of the first mentioned device and moving the movable part of the secondly mentioned device.

The mechanism here shown and described is economical of structure and operation, is efficient of operation and forms a unit that can be used for different kinds of machines; the unit being composed of sub-units each unit being transferable to other units wherein a part or elements is to be moved.

The unit structure of the present invention eliminates the necessity of discarding devices that became useless when changing types of machines previously manufactured and adapts the devices to be used for new manufacturing by merely changing the device to hold the new manufacture and add or transfer thereto the whole or any part of the present invention taken from a now useless part of a machine.

Also, when periodic changes in machines, automobiles for instance, are made, such as new models, the tools jigs or fixtures can be carried from year to year and the moving means of the present invention, or means similar thereto, may be exchanged or transferred to modified devices or machines from prior devices and, when necessary be transferred back to the former device again and there used for repair production and again transferred to the new device for current production.

Also, when a number of parts are to be machined at different times or at successive periods, one moving means may be used for each of the parts holding devices and either the entire moving means or one or more parts thereof may be used successively in each part holding device so that one moving means will answer for a large number of different work holding devices.

This eliminates carrying a large number of moving means and is advantageous in the arts in that much expense is saved by making one moving means to operate more than one parts holding devices.

Having set forth my invention and being aware that changes and modifications can be made in structure and arrangement of elements from the specific structure and arrangements herein described and shown in the drawing and, therefore, without limiting myself to the precise structure and arrangements of elements as is herein shown and described,

I claim:

1. A device of the character described consisting of an elongated housing, a ram mounted therein and slidable longitudinally thereof, said ram being provided with a transverse groove, a portion of which is at substantially right angles to the axis of the ram and a part of which is arcuate, a shaft mounted for rotation in a wall of said housing and with its axis at right angles to the axis of the ram, said shaft having an enlarged cylindrical portion at its inner end adjacent the ram, an eccentrically located crank pin carried by said enlarged portion on its inner face in position and adapted to cooperate with said groove, and means to rotate said shaft.

2. A device of the character described consisting of an elongated housing, a ram mounted therein and slidable longitudinally thereof, said ram being provided with a transverse groove, a portion of which is at substantially right angles to the axis of the ram and a part of which is arcuate, a shaft mounted for rotation in a wall of said housing and with its axis at right angles to the axis of the ram, said shaft having an enlarged cylindrical portion at its inner end adjacent the ram, an eccentrically located crank pin carried by said enlarged portion on its inner face in position and adapted to cooperate with said groove, and means to rotate said shaft, the center point of the arcuate portion of said groove being outside of a plane determined by the axes of the ram and shaft.

3. A device of the character described, consisting of an elongated housing, a ram mounted therein and slidable longitudinally thereof, said ram being provided with a transverse groove, a portion of which is at substantially right angles to the axis of the ram and a part of which is arcuate, a shaft mounted for rotation in a wall of said housing and with its axis at right angles to the axis of the ram, said shaft having an enlarged cylindrical portion at its inner end adjacent the ram, an eccentrically located crank pin carried by said enlarged portion on its inner face in position and adapted to cooperate with said groove, and means to rotate said shaft, the center point of the arcuate portion of said groove being on the opposite side of the plane determined by the axes of the ram and shaft, from said groove.

4. A device of the character described consisting of an elongated housing, a ram mounted therein and slidable longitudinally thereof, said ram being provided with a plane surface and having a transverse groove in said surface, a portion of which is at substantially right angles to the axis of the ram and a portion of which is arcuate and about a center located on the opposite side of the longitudinal center line of said surface, a rotatable shaft extending into said housing at right angles to the axis of said ram and having its inner end diametrically greatly enlarged, a bearing for said shaft and a bearing for said enlarged end, a crankpin fixed to the inner face of said enlarged end and fitting into said groove, and means to rotate said shaft.

GUY E. SWARTZ.